A. DE VILBISS, Jr.
SCALE.
APPLICATION FILED MAR. 27, 1905.
1,259,455.
Patented Mar. 12, 1918.
7 SHEETS—SHEET 3.
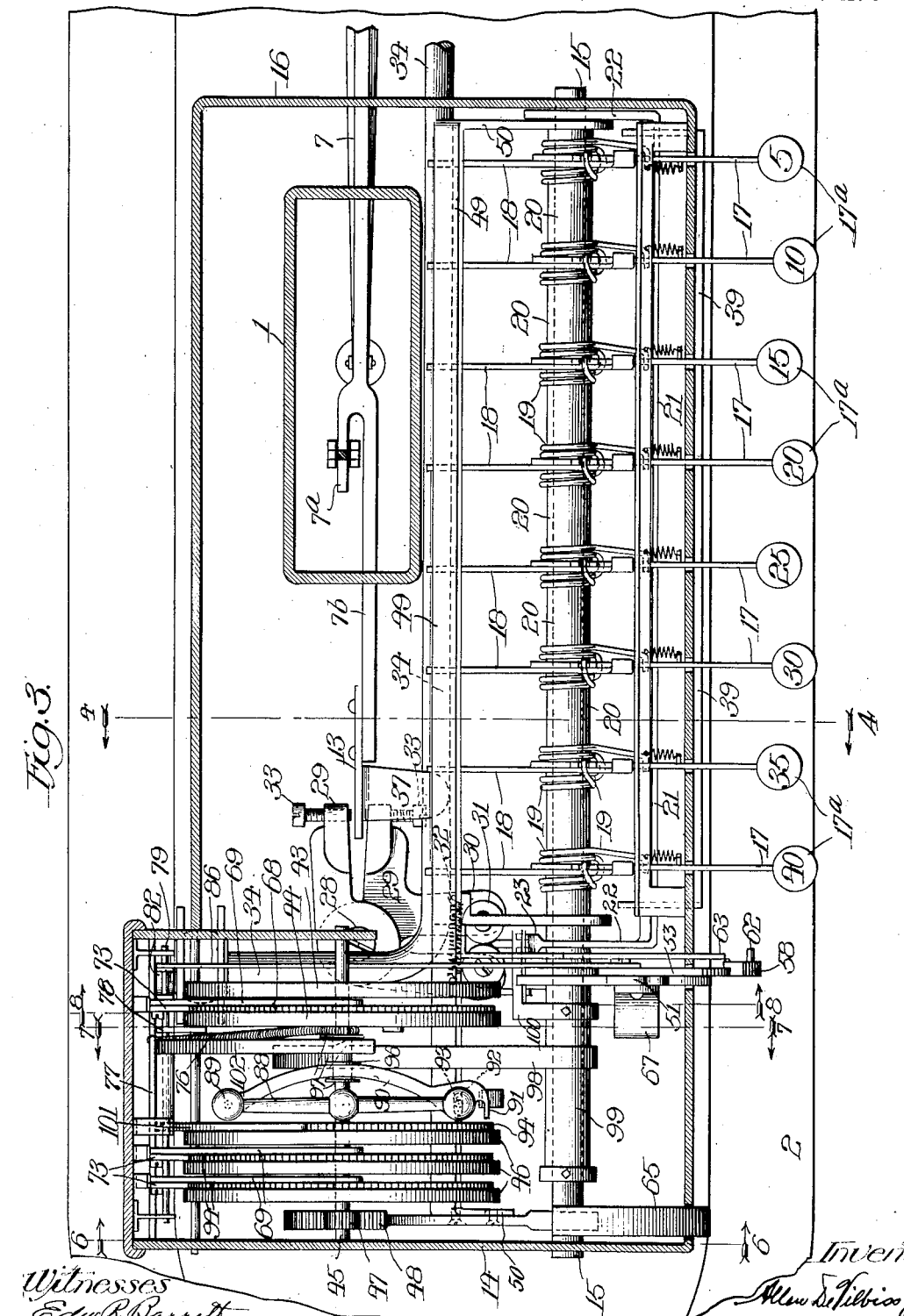

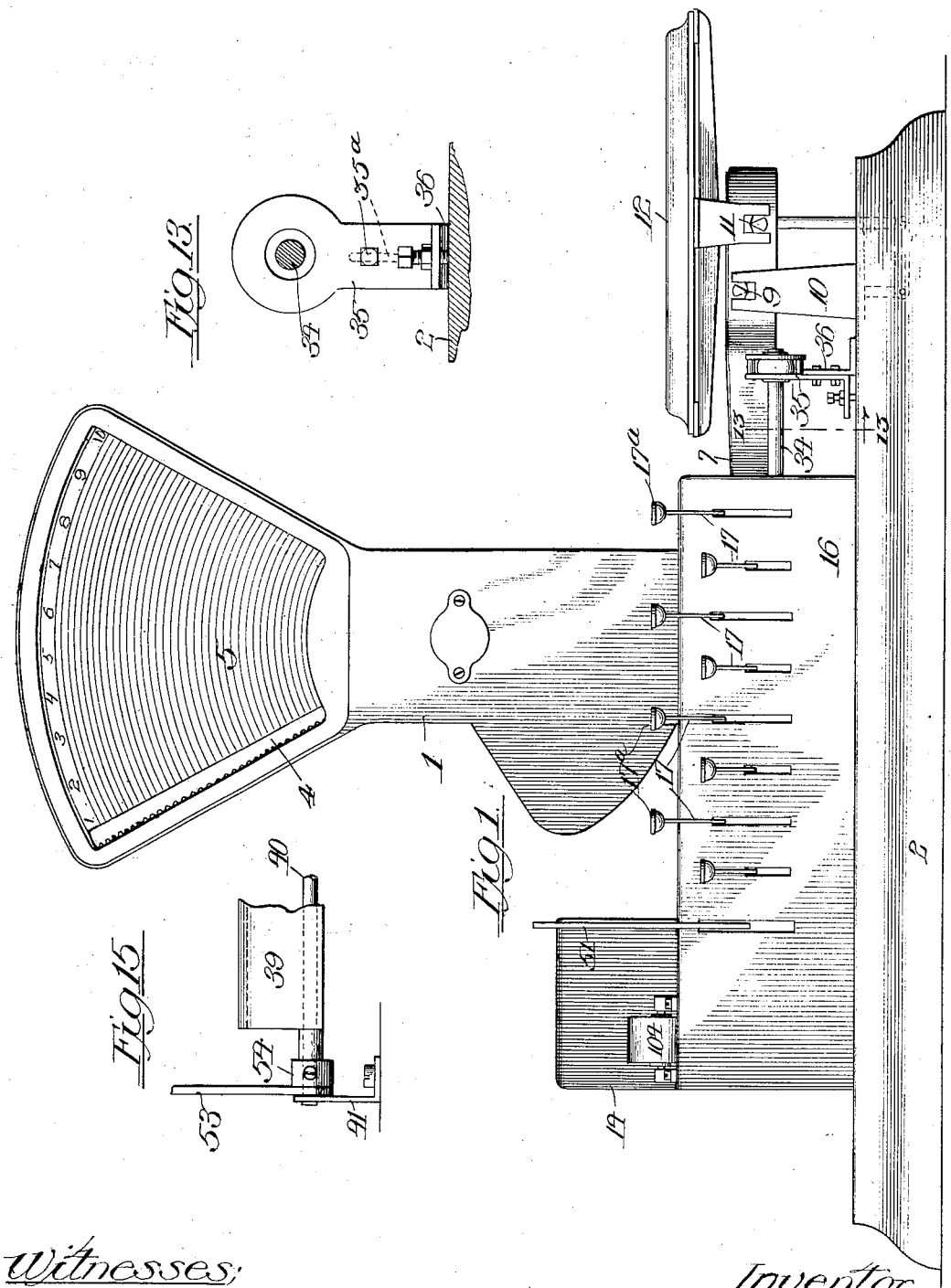

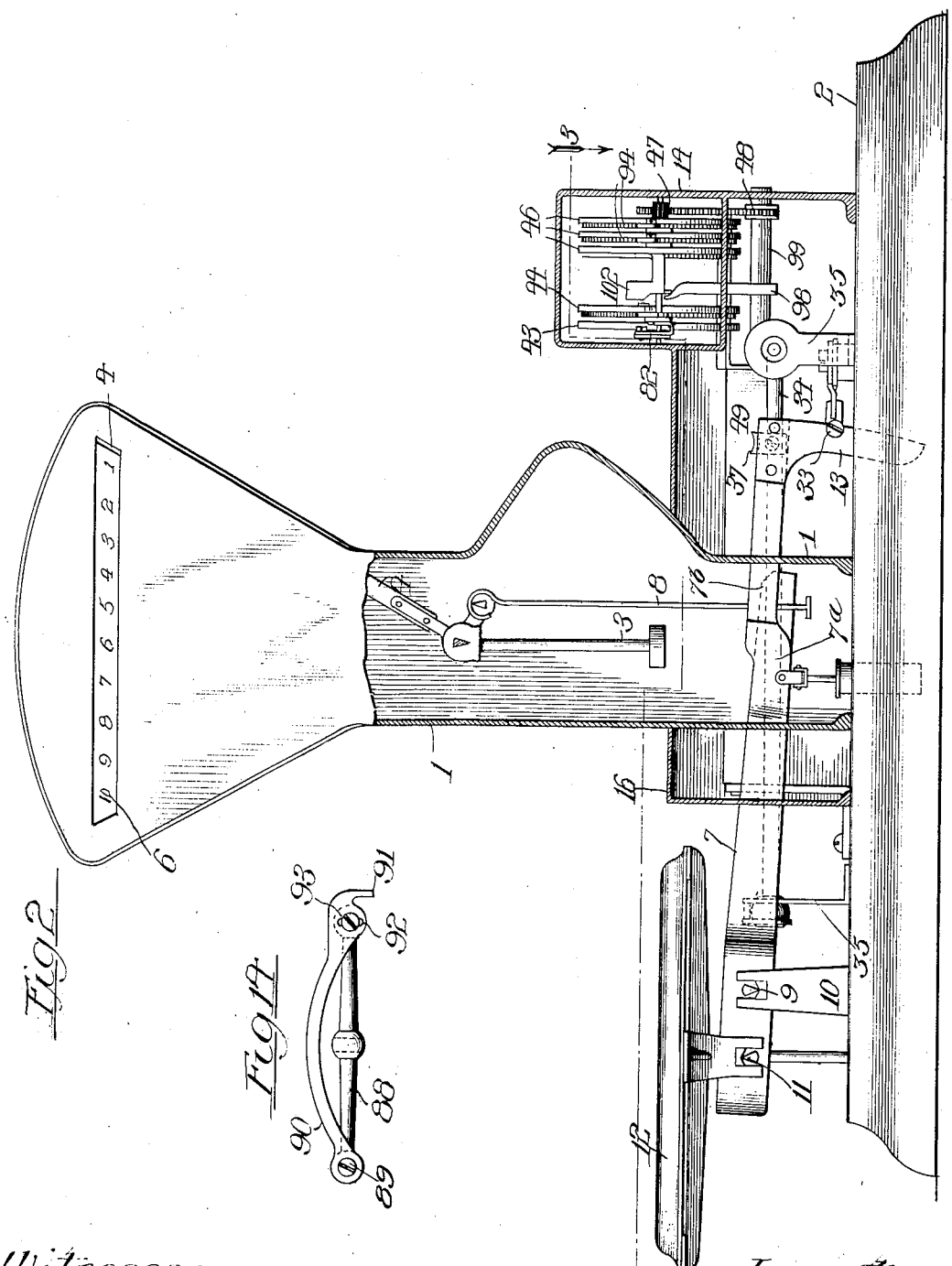

A. DE VILBISS, Jr.
SCALE.
APPLICATION FILED MAR. 27, 1905.
1,259,455.
Patented Mar. 12, 1918.
7 SHEETS—SHEET 4.
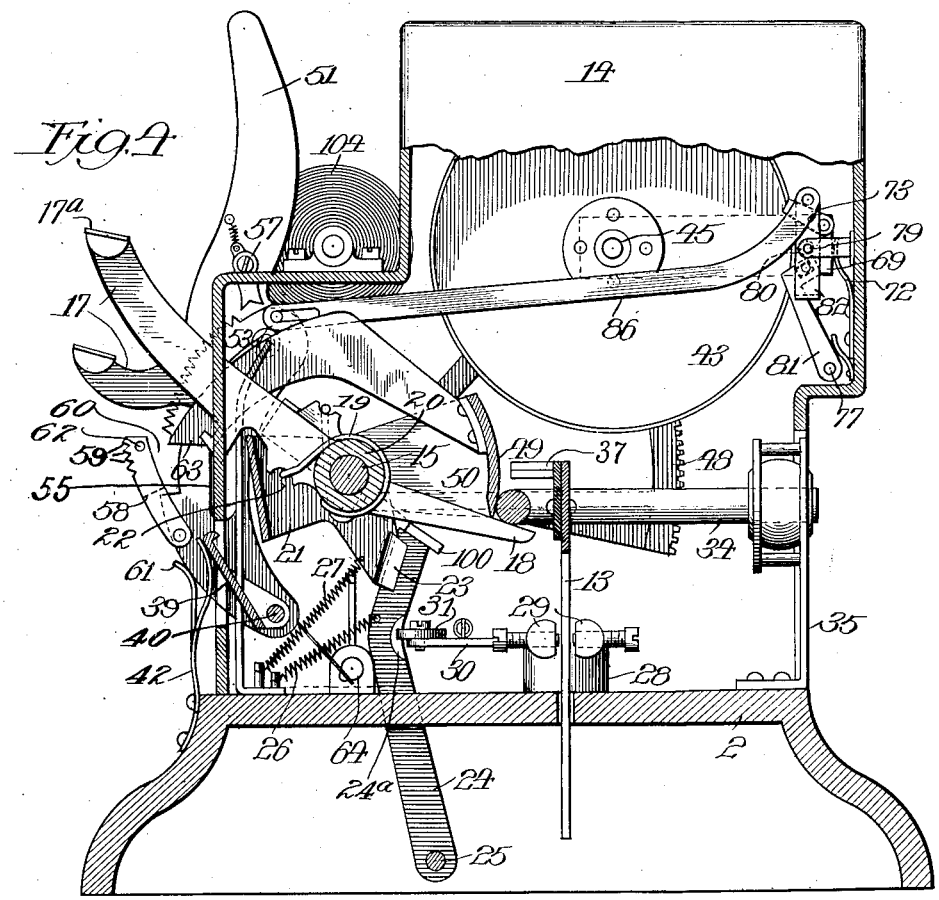
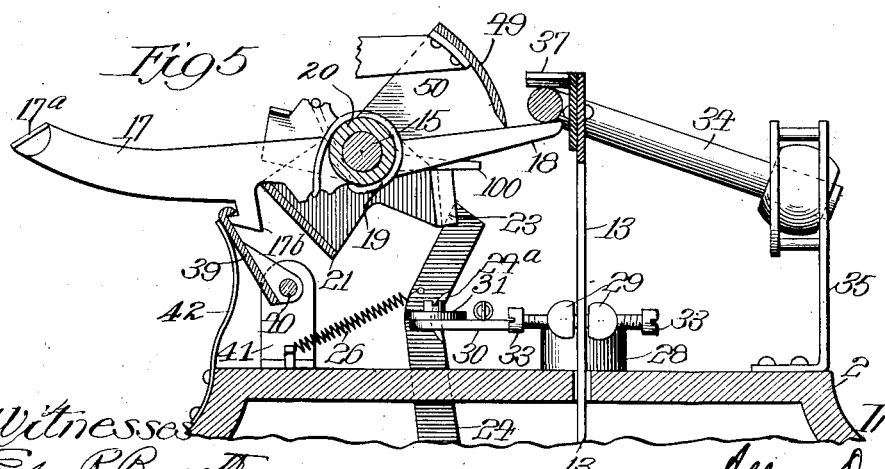

A. DE VILBISS, Jr.
SCALE.
APPLICATION FILED MAR. 27, 1905.

1,259,455.

Patented Mar. 12, 1918.
7 SHEETS—SHEET 5.

Witnesses:
Edw. R. Barrett
Louis B. Erwin

Inventor
Allen De Vilbiss Jr.
By Hector & Hibben
his Attys.

A. DE VILBISS, Jr.
SCALE.
APPLICATION FILED MAR. 27, 1905.

Patented Mar. 12, 1918.

A. DE VILBISS, Jr.
SCALE.
APPLICATION FILED MAR. 27, 1905.

1,259,455. Patented Mar. 12, 1918.
7 SHEETS—SHEET 7.

Witnesses
Edw. P. Barrett
Louis B. Erwin

Inventor
Allen De Vilbiss Jr.
By Hector & Kibben
his Attys

UNITED STATES PATENT OFFICE.

ALLEN DE VILBISS, JR., OF TOLEDO, OHIO, ASSIGNOR, BY MESNE ASSIGNMENTS, TO TOLEDO SCALE COMPANY, OF TOLEDO, OHIO, A CORPORATION OF NEW JERSEY.

SCALE.

1,259,455.

Specification of Letters Patent.  Patented Mar. 12, 1918.

Application filed March 27, 1905.  Serial No. 252,230.

*To all whom it may concern:*

Be it known that I, ALLEN DE VILBISS, Jr., residing at Toledo, in the county of Lucas and State of Ohio, have invented certain new and useful Improvements in Scales, of which the following is a specification.

My invention relates to a scale of the automatic type (spring or pendulum) combined with indicating or check printing mechanism and adding or accumulating mechanism coöperating in such manner that the value of an article at a given price per pound may be printed upon a check and a record kept of the total of the amounts of the different transactions. In the present instance, the check printing and adding mechanism coöperates with the scale beam or lever of an automatic scale so that the usual chart or drum of a weighing or computing scale may be dispensed with, although the employment of the same is preferred, inasmuch as it may be found useful as between the salesman and customer in preliminarily arriving at an agreement concerning the weight and price of the article to be purchased before the check printing mechanism is brought into operation. It results from my construction and arrangement of scale that a check may be printed with the value of the article at any price per unit of weight and a total record kept of all the transactions of the scale, such check being printed in the present instance from a strip or roll and cut off and ejected from the machine. The various features of utility and advantage in my machine or scale will be apparent from the description hereinafter given.

Figure 6:
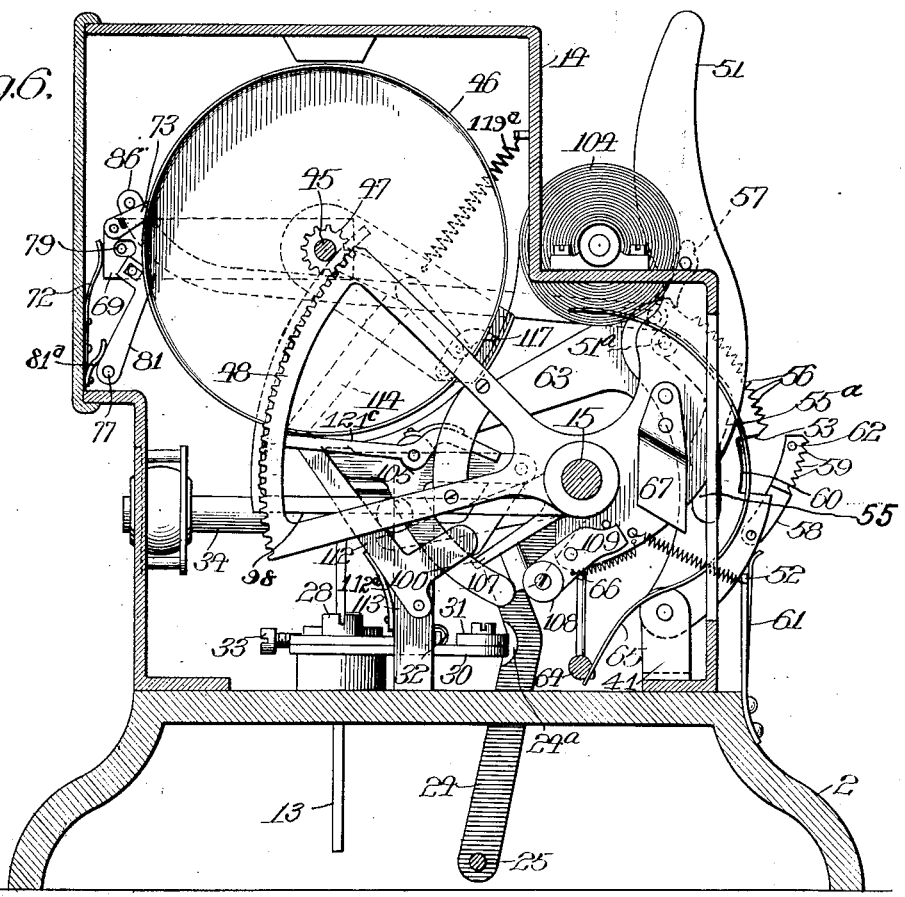
Figure 12:
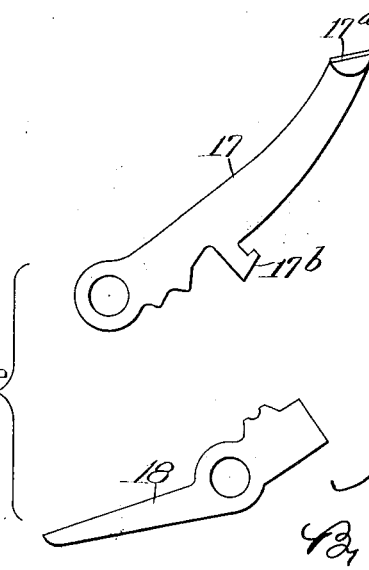
Figure 7:
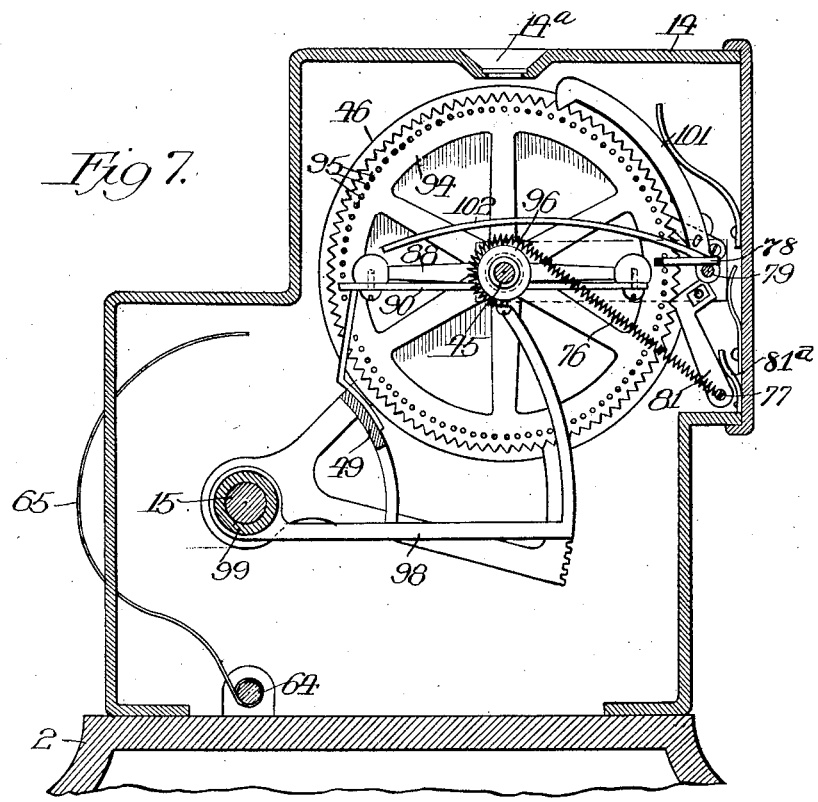
Figure 8:
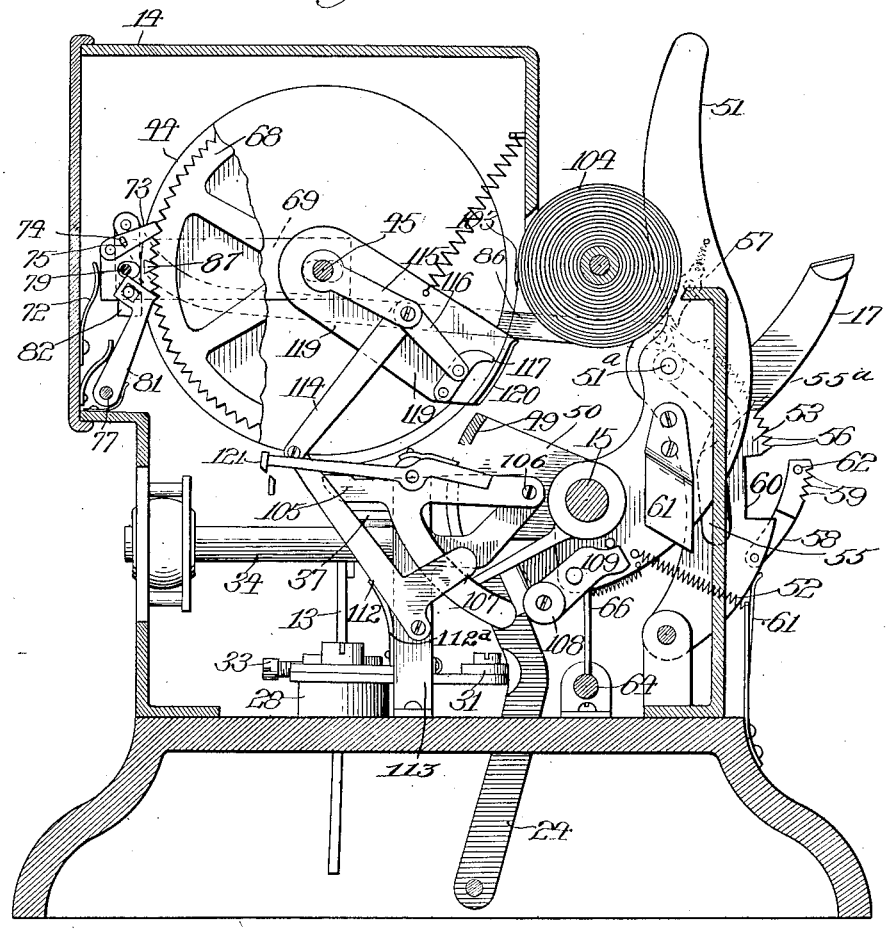
Figure 9:
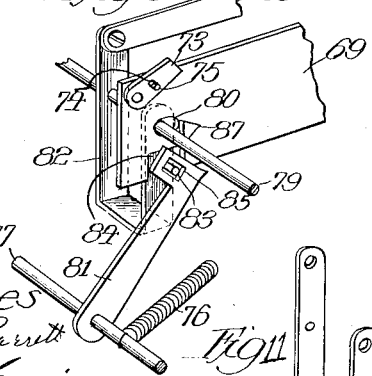
Figure 10:
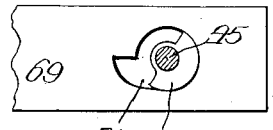
Figure 11:
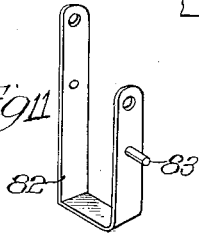

In the drawings, Figure 1 is a front elevation of my scale viewed from the salesman's side; Fig. 2 a rear elevation of the machine viewed from the customer's side with portions of the scale housing broken away to expose the parts therewithin; Fig. 3 a sectional plan on the irregular line 3—3 of Fig. 2; Fig. 4 a sectional elevation on the line 4—4 of Fig. 3; Fig. 5 a detail view showing certain of the parts illustrated in Fig. 4 when one of the price keys is in operated or depressed condition; Fig. 6 a sectional elevation on the line 6—6 of Fig. 3, looking in the direction of the arrow; Fig. 7 a sectional elevation on the line 7—7 of Fig. 3, looking in the direction of the arrow; Fig. 8 a section on line 8—8 of Fig. 3 looking in the direction of the arrow; Figs. 9, 10 and 11 detail views of the transfer and locking mechanism for the dials; Fig. 12 detail views of the two lever members or sections of each price key; Fig. 13 a detail view of the adjustable bearing of the stop bar, the view being a sectional elevation on line 13—13 of Fig. 1; Fig. 14 a detail view of the members of the make and break connection for the adding mechanism; Fig. 15 a detail view of the key-locking or detaining bail and associated parts; and Fig. 16 an elevation of the mechanism for printing, cutting and ejecting the check. In Figs. 4, 5 and 6 certain details are omitted for the sake of clearness.

As hereinbefore stated, the indicating or check printing mechanism, as well as the accumulating mechanism, coöperates with the main lever or scale beam of an automatic scale here shown as of the pendulum type and as a result the usual weighing or computing chart or drum may be dispensed with. However, it is preferred to retain such chart or drum for the reason hereinbefore stated, and consequently I have illustrated the same in connection with the parts constituting my invention, but without intention of limitation thereof. Moreover, while I have preferred to illustrate and describe my invention in connection with an automatic scale of the pendulum type, yet it will be understood that such invention is not limited in its application, to such particular type, but that it may be employed in connection with other types of scales used for the same general purposes.

Referring to the form of scale and to the particular embodiment of my invention as illustrated in the drawings, the scale which I have employed for the purpose of a clear and comprehensive description is of the pendulum type, substantially as shown and described in my prior patent, Re-issue No. 12,137, dated July 28, 1903. In the present instance and as substantially shown in said patent, a scale housing 1 is mounted upon a base 2, which supports the working part of the machine. The housing 1 contains the operating parts of the scale which as illustrated in Fig. 2 comprise essentially the pendulum 3 operatively connected with the indicator or pointer 4 arranged to swing over the chart 5, as indicated in Fig. 1. Inasmuch as I have shown the chart of a computing scale, such chart contains price computations, as well as the weight indications, both of which are exposed to the salesman, while the weight computations alone are exposed to the customer through the sight opening or slot 6, as shown in Fig. 2. The pendulum is operatively connected with the scale beam or main lever 7 of the scale by means of the link or connection 8 (Figs. 2 and 3) for which purpose and for the purpose of affording an operating connection with the mechanism constituting my invention, the free end of such main lever is bifurcated as indicated clearly in Fig. 3, the link 8 being connected with the fork 7ª, while the other fork 7ᵇ is considerably extended longitudinally so as to coöperate with the adding and the check printing mechanism in a manner hereinafter made apparent. The main lever 7 is pivoted at 9 to the standards 10 rising from the base of the machine, and such main lever also has pivotal bearing connection at 11 for the scale platform 12.

The form and construction of scale as above described are well known and in common use, with the exception of the extension or fork 7ᵇ of the main lever or scale beam 7, which is extended for the purpose hereinbefore explained. The main lever is further provided with a vertically-arranged plate or sector 13, the same in the present instance being made separate from but secured to and depending from the main lever, as clearly shown in Fig. 2.

The check-printing and adding mechanism with which the scale coöperates is arranged within a casing 14, which in the present instance is located toward the left-hand end of the machine when viewed from the salesman's side, as in Fig. 1, and into this casing extend certain operating connections whose movement is under the control indirectly of the main lever or scale beam of the scale.

Referring first to these controlling connections and to the price keys which govern their movements, I provide a main shaft or rod 15 at a point above the base of the machine and extending longitudinally thereof. In the present instance, this shaft or rod which forms a support for parts hereinafter described is secured at its right-hand end in the right-hand portion 16 of a frame or casing arising from the base of the machine and at its left-hand end in the left-hand portion 14 of said casing. Upon this shaft or rod 15 are mounted a series of keys which I will term price keys, inasmuch as they represent different prices per pound or other unit of weight and have an operating value accordingly.

As indicated more particularly in Figs. 3, 4, 5 and 12, each price key is made in two parts or sections 17 and 18, both of which are strung upon the rod 15 and are normally held together as a single key lever by means of a rather strong spring 19, coöperating with such parts of the key and holding them together as a single key against ordinary pressure, but permitting the part 17 to be moved independently after the strength of the spring has been overcome. Each price key is therefore a two-part key operating together as a unit for a portion of the travel in the depression of the key, but permitting the part 17 to be further depressed after the movement of the part 18 has been arrested in the manner hereinafter explained. It is clear that the movement of the part 17 after the part 18 has been arrested is an idle movement and only the movement partaken of by the part 18 previous to its arrest is effective. In broader claims, however, I do not wish to be limited to a two-part key for it will be apparent other constructions might be used, as for example, a one-part key to secure the desired movement of a computing and indicating means. Therefore, in the claims I have referred to so much of the movement as actuates the computing and indicating mechanism as the effective movement. Each key terminates at its upper end in an enlargement or button 17ª, on which may be indicated the values represented by the different keys. For instance, as shown in Fig. 3, the price keys have an increasing value from right to left beginning with five cents per pound and in the present instance running to forty cents per pound, although as will be understood the number of keys may be varied and the prices represented by them may be likewise varied to accommodate the particular character of trade or articles to be sold on the machine. As clearly indicated in Fig. 3, the keys which are strung loosely on the shaft or rod 15, are separated and kept in proper position by means of the distance or spacing collars 20.

Referring to Figs. 3, 4 and 5, a bail 21 having its parallel end arms 22 mounted to rock on the rod 15 is positioned below the lower edges of the price keys, in such manner that when any one of such keys is depressed such bail will be likewise depressed or rocked. The object of this bail is to actuate means for clamping the main lever of the scale in the particular position to which it has been moved by the load or article on the platform, so that the check printing and adding mechanism may be operated and the desired results obtained, with the particular position of the main lever as one of the factors. To this end, the arm 22 on the left-hand end of the bail 21 (Fig. 3) is made in the form of a bell crank, by reason of the provision of the arm 23, whose rearward or right-hand edge (Figs. 4 and 5) is formed as a cam surface arranged to bear against the upper end of and thereby rock a substantially vertical lever 24, pivoted at its lower end at the point 25 within the base of the machine. This lever 24 is normally held with yielding pressure to a forward position—that is to the left in Figs. 4 and 5 by means of a spring 26, so that the bail operates such lever against the tension of that spring. The bail itself is held in the normal or upward position indicated in Fig. 4, in suitable manner, as by means of a spring 27.

The rocking arm 24 is adapted to coöperate directly with the means for clamping the scale beam or main lever of the machine to the particular position to which it has been brought by the load in the operation of the scale. In the present instance, this clamping means which is shown clearly in Figs. 3 to 6 consists of a pair of L-shaped levers pivoted intermediate their length on a stud 28, rising from the base of the machine, and terminating at one end in jaws 29 arranged on opposite sides of the sector or plate 13 of the main lever of the scale. The other end of these pivoted levers consists of a pair of arms 30 arranged parallel to each other and provided at or near their extreme ends with anti-friction rollers 31. These arms and rollers extend into proximity to the rocking arm 24 which as clearly shown in Figs. 3 to 6, is provided on its rearward edge with a wedge surface 24ª arranged to enter in between the rollers and the arms 30 and thereby spread such arms apart against the tension of the spring 32, which normally tends to hold such arms together and the clamping jaws open. The result of this spreading of the arms 31 is to close the clamping jaws against the sector 13 and thereby hold the main lever of the scale at the position to which it has been moved by the load on the platform. In the present instance, the clamping jaws proper do not themselves contact the sector 13, but for this purpose I provide a pair of regulating screws 33 screwing transversely through the outer ends of the jaws with the inner ends in proximity to the sector 13, by the use of which screws I obtain an adjustment so that both jaws will clamp the sector in unison and also to the proper degree. It will be understood therefore from the foregoing description, that when any one of the price keys is depressed and the bail 21 consequently rocked downwardly, the clamping jaws are operated to clamp the sector 13 and consequently the main lever 7 of the scale, so that the indicating and check printing mechanism and, in the present instance the adding mechanism, may be subsequently operated according to said particular position of the main lever 7, which position is one of the factors in the operation and controls the amount to be indicated by said mechanism and transferred to the adding mechanism and also printed upon the check as hereinafter explained.

The main lever of the scale controls the particular position or elevation of a stop bar 34, which as shown, is L-shaped and provided at its ends with ball and socket connections with frames or standards 35 rising from the base near opposite ends thereof, as indicated in Figs. 1, 2, 4 and 5. In the present instance, the ball portion of this joint or bearing is formed on the stop bar itself, while the frames or standards comprise the sockets to receive the balls, with the result that the stop bar is free to be moved upwardly by the price keys as now about to be explained. By preference, the ball and socket joint at the right-hand end of the machine (Fig. 1) and adjacent the platform is made adjustable in height, to which end the standard 35, which is in the form of a plate, has bolt and slot connections 35ª with the fixed plate 36, which is secured to the base of the machine, Fig. 13. It is evident that according to this construction the joint may be adjusted up or down according to requirements for the proper and accurate coöperation between the scale mechanism or main lever thereof and the indicating and check printing mechanisms.

The stop bar 34, as to its longer member, extends longitudinally of the machine parallel to the main lever of the scale and is positioned in the path of movement of the lower or inner section of the price keys so as to be contacted and raised whenever any one of them is depressed as to its forward or button end. The amount of elevation of the stop bar by means of any one of the price keys is determined and limited by the particular position to which the main lever of the scale has been brought by the load on the platform, in which position it has been clamped by the clamping jaws. To this end, the main lever is provided with a stop 37, extending laterally and forwardly into the path of vertical movement of the stop bar, as indicated in Figs. 3, 4 and 5. As illustrated, such stop is secured to the sector. It results from the construction and arrangement just described that after the main lever of the machine has been clamped, the depression of a price key will elevate the stop bar 34 until it contacts the stop 37, whereupon further movement of the stop bar, as well as the section 18 of the particular price key depressed, is arrested, but as will be understood, the other section 17 of the particular price key will continue to move independently of its companion and against the tension of the spring which tends to hold them together in a fixed relation. The price key, or rather the section 17 thereof, is depressed against the tension of its spring 19 until its hook-shaped portion 17$^b$ engages the universal locking or detaining plate or bar 39, which is pivoted upon a rod 40 mounted at its ends in the plates or standards 41 rising from the base of the machine, as indicated in Fig. 15. This locking plate is normally pressed rearwardly in suitable manner, as by means of the spring 42 (see Fig. 4) so that after being forced forwardly by the projecting portion 17$^b$ of any one of the price keys, its hook-shaped end will engage said projection or hook of the price key and hold the same depressed until released in the operation of the check printing mechanism, as hereinafter explained.

Referring next to the check printing and adding mechanism, and the operating connections which are controlled by the particular position of the scale beam or main lever of the scale, it will be understood that I provide for these purposes a set or series of adding wheels of any number according to the desired capacity and also a separate series of wheels arranged to indicate, and, in the particular instance shown, to coöperate with printing mechanism. The check printing wheels relate to and indicate the amount or value of individual transactions, whereas the adding wheels relate to and indicate the total of individual transactions. Inasmuch as these wheels indicate cents, dimes, dollars, etc., they are each provided on their periphery with numbers from 1 to 100 and the actuating and transfer mechanism is constructed accordingly, as hereinafter explained.

As indicated more particularly in Fig. 3, the wheels or dials 43 and 44, in the present instance two in number although any desired number may be employed, are the wheels which coöperate with the check printing mechanism and which record the individual transactions. The wheel 43, which may be considered the cents wheel, is secured to the transverse shaft 45 journaled at its ends in the casing 14. The companion wheel 44 is mounted loosely upon such shaft and such is the case of all of the adding wheels 46, which in the present instance are three in number. It will be understood that transfer mechanism of suitable character, such as that hereinafter described, is provided to transfer from the wheel 43 to its companion wheel 44, as well as in respect to the wheels 46 from lower to higher denomination.

As indicated more particularly in Figs. 3 and 6, the shaft 45 is provided near its outer left-hand end (Fig. 3) with a pinion 47, which is adapted to mesh with a gear segment 48, mounted to rock upon the stationary rod or shaft 15, hereinbefore referred to. For operating this gear segment predetermined distances according to the particular position of the main lever or scale beam and thereby cause a transfer of the value as indicated by the scale to the wheels, I operatively connect this segment with an operating plate 49 which is arranged in the path of movement of the inner sections of the price keys and adapted to be elevated thereby as far as permitted by the stop bar 34. In the present instance, this operating plate 49 is in the form of a bail whose parallel arms 50 are mounted to rock loosely upon the rod 15. This operating bail, however, is extended beyond its left-hand arm 50 (Fig. 3) and secured in suitable manner to the inner side of the segment 48, as indicated in Figs. 3, 6 and 7, with the result that the movements of the price keys are communicated to the segment 48 and eventually to the indicating and adding wheels, as hereinafter made apparent.

The necessary differential effect is secured by reason of the varying distances from the stop bar's pivotal points to the points of contact with said stop bar of the different key levers. Thus, the key lever bearing the numeral 5 being nearer the right hand pivot of said stop bar than any of the other key levers, will sooner bring said stop bar into contact with the stop projection 37 of the scale beam. Hence the bail 49 is not moved to so great an extent by the five-cent key lever and the extent of movement of said bail increases with the increased valuation of the key levers as their points of contact with the stop bar increase in distance from the right hand pivot of said bar as the parts are viewed in Fig. 3.

The movement of the operating bail 49 is communicated directly to the individual wheels 43, 44 and also to the adding wheels immediately upon movement of such bail, and the value of the article, as determined by the position of the main lever of the scale in combination with the particular price key depressed, is thereby communicated to all of said wheels and indicated by the individual wheels 43, 44. For the purpose of releasing the particular key operated and also restoring to normal position the other parts, including the wheels 43, 44, which are reset to zero position, and including also the clamping mechanism and other parts hereinafter described, I employ suitable means such as the handle or operating lever 51, which is mounted loosely upon the shaft or rod 15, so as to rock thereon, Figs. 3, 4 and 6. This operating lever is adapted to be drawn forward by the operator against the tension of its spring 52, tending to hold the same in the normal position indicated in Figs. 4 and 6. In a plane parallel with the operating lever or handle is pivoted an upwardly extending ratchet and cam plate 53, which is formed integral with or secured to a hub or collar 54, loosely mounted upon the shaft 40, upon which the locking plate is also mounted, Fig. 15. This collar or hub is operatively connected with the arms of the locking plate, with the result that when the plate 53 is rocked forwardly the locking plate is correspondingly rocked, so as to release the particular price key which had been depressed. For this purpose, the operating handle coöperates with the plate 53 to give the latter the desired rocking movement at the proper time and to this end and as indicated in Figs. 4 and 6, the plate 53 is provided with an irregular slot, the intermediate or angular portion 55ª only of which is effective, one end portion being concentric with the shaft when the said plate is at normal and the other end portion being concentric with said shaft when said plate has been moved outward. This slot receives a stud or pin 51ª projecting laterally of the operating handle, with the result that when the handle is drawn forwardly, the plate 53 and the locking bail will be actuated when the operating handle or lever reaches the middle of its forward stroke.

The plate 53 is provided on its forward edge with ratchet teeth, 56, with which coöperate a spring pressed pawl 57 pivoted on one side of the operating lever. The object of this pawl and ratchet is to compel a full stroke of the operating handle after once being started. In order to reverse the pawl and enable the operating handle to return to normal position, I provide an arm 58 pivoted at its lower end to one side of the plate 53 and provided on its forward edge with ratchet teeth 59, which, when the arm is forced into the slot 60 in the plate 53, constitutes a continuation of the ratchet teeth 56. In the path of movement of the arm 58 is placed a flat spring 61 projecting upwardly and arranged to force the arm 58 into said slot 60 when the operating handle and the plate 53 are downwardly or forwardly rocked. When the pawl on the operating handle reaches the ratchet teeth on the arm 58, it will reverse owing to the fact that such arm 58 is movable inwardly so as to permit that pawl to turn, after the printing mechanism has returned to zero. The arm 58 subserves another purpose, inasmuch as it constitutes a stop against the upward movement of the operating bail 49, after it has been restored to normal position upon the movement of the operating handle by connections hereinafter explained. To this end, the arm 58 is provided on its right-hand side (Fig. 3) with a laterally extending pin 62 adapted when the arm 58 is forced rearwardly by the spring 61, to take its position beneath a plate or arm 63, which is secured to and movable with the operating bail. Consequently, so long as the arm 58 remains in its rearward position, the operating bail cannot be actuated and the machine is thereby prevented from being juggled.

Referring more particularly to Fig. 6, the operating bail 49, as well as the segment 48, moves in a clockwise position upon the depression of any one of the price keys and communicates the proper value to the dials. In order to restore the operating bail and segment to normal position at the proper time, I employ a rock shaft 64 arranged near the base of the machine and provided at its outer end with an operating connection 65 which in the present instance, is a curved flat spring to afford a yielding connection between the rock shaft 64 and the gear segment 48. The rock shaft is provided near its other end with a projecting arm 66, which is arranged in the path of movement of an operating arm 67 secured to and extending from the left-hand side (Fig. 3) of the operating handle 51. The construction and arrangement is such that when the operating handle is depressed or drawn forwardly the arm 67 will engage the arm 66 and rock the latter and likewise the spring connection 65 forwardly. The upper or free end of the connection 65 is arranged in the path of movement of the gear segment 48, with the result that such segment, as well as the operating bail 49, will be restored to normal position and the indicating wheels 43, 44 re-set to zero position, but without interfering with the adding wheels.

Referring next to the two sets of wheels and to their operating connections, and referring first to the indicating wheels 43, 44, the same comprise in the present instance, disks with peripheral flanges, on which the indications—that is the numbers from 1 to 100 are formed, in the present instance such figures being in the form of type against which the paper or check is forced, to receive an imprint. The inner wheel 44, however, which is loosely mounted on the shaft 45 is provided on its inner surface with a circular rack 68, which is adapted to coöperate with the transfer mechanism, about to be described, Figs. 3 and 8. This rack may be formed in any suitable manner, either as an integral or separate part as compared with its dial, and the same consists of a series of 100 teeth corresponding in number to the number of the indications.

As shown, the transfer mechanism consists of a substantially horizontal arm or bar 69 (Figs. 8 and 9) coöperating with driving and locking pawls for the purpose of moving the wheel 44 one notch or indication for every complete rotation of its companion wheel 43. The bar 69 is actuated by and under the control of the wheel 43 and to this end such dial is provided near its center with a cam plate 70 arranged to coöperate with an irregular-shaped opening 71 in the bar 69, all as clearly indicated in Figs. 8, 9 and 10. This bar 69 is held forwardly, that is to the right, in suitable manner as by means of the spring 72 (Fig. 8) and the cam 70 while working in the circular portion of the opening 71 resists movement of the bar 69 until such cam presents itself to the opposite portion of the opening 71, whereupon the bar 69 is permitted to move forwardly. It will be understood that the cam 70 is so positioned on the wheel 43 as to permit this movement of the bar 69, just as the latter wheel has completed a full revolution, at which time it is desired to transfer "1" to the wheel 44. As herein shown, the means for effecting this transfer to the dial 44 through the medium of the shifting or operating bar 69 consists of a pawl 73 pivoted on said bar 69, with its free end in engagement with the circular rack 68 in such manner that when the bar 69 is moved forwardly as above stated, the rack 68 and consequently the wheel 44, will be advanced the distance of one tooth—that is of one indication. To limit the movement of this pawl in both directions, the same is provided with a slot 74 receiving a pin 75 projecting from the bar 69. It will be understood that the wheel 44 is normally restrained from movement by means of a spring 76 which in the present instance is a coiled spring secured at one end to the rod 77, extending transversely of the casing 14, and secured at its ends therein (see Fig. 7). The other end of this spring is connected to the hub of the wheel 44, with the result that the spring becomes wrapped around such hub when the dial is actuated. Inasmuch as the function of this spring is to re-set the wheel 44, the same may be denominated a re-setting spring. The zero position of the wheel 44 is determined by a projection or lug 78 extending beyond the periphery of such dial and located at such a position thereon as that such wheel will be at zero position when the lug strikes against and is arrested by the rod 79 extending transversely of the casing 14 and secured at its ends therein, as seen in Figs. 3, and 4. In this connection, it will be observed that the outer or rearward end of the operating bar 69 is also supported on this rod 79 which passes through the elongated slot 80 in said bar. In order to lock the rack 68 at the proper time, I provide a locking pawl 81 pivoted at its lower end on the rod 77 and normally pressed as to its upper end in a forward direction by a spring 81ᵃ, into engagement with the rack so as to prevent any backward movement of the dial 44. This locking pawl is under the control of the operating handle 51 in such manner that after the check has been printed as hereinafter explained, the wheels 43, 44 are both permitted to be restored to zero position. To this end, a yoke 82, is loosely mounted on the rod 79 and provided on one of its members or arms with a laterally projecting stud or pin 83 arranged to work freely in a slot 84 in the bar 69 and adapted to be received by a slot 85 in a lateral extension of the locking pawl 81, all as clearly indicated in Figs. 9 and 11. By the swinging of this yoke in the proper direction, the locking pawl is withdrawn from its operative position and the transfer or carrying bar 69 retracted by the action of the pin 83 against the rear side of the slot 84, with the result that the spring 76 is permitted to re-set the wheel 44 to zero position. For the purpose of thus swinging or rocking the yoke on the operation of the handle 51, these parts are connected in suitable manner, as by means of the link 86 (Figs. 3, 4, 6 and 9) pivoted at one end to said yoke and having a slot-and-pin connection at the other end with the plate 53, as shown in Fig. 4. It will be understood that the other wheel 43 is restored to zero position at or about the same time through the medium of the shaft 45, to which it is secured, as hereinbefore described.

For the purpose of preventing overthrow of the dial 44 and also preventing it from being moved more than one tooth at a time, I provide on the bar 69 a tooth 87, in such position thereon as to engage between two succeeding teeth on the rack 68 when the dial is in exact position or register, as compared with the printing mechanism.

Referring next to the adding wheels, the same transfer mechanism may be provided therefor as in relation to the wheels 43, 44, as seen in Fig. 7 and for this reason the description of such transfer mechanism need not be repeated, but the parts have been similarly lettered in said Fig. 7. All of the adding wheels are mounted loosely upon the shaft 45, but a make and break connection or clutch is provided between such shaft and the adding wheel of the lower denomination—that is the outermost wheel on the right, according to Fig. 3. This make and break connection in the present instance consists of a bar 88 secured intermediate of its length to the shaft 45 and rotatable therewith, this bar being arranged parallel with and in close proximity to the outer face of said right-hand adding wheel, as clearly indicated in Fig. 3. Upon one end of this bar at the point 89 (Fig. 3) is pivoted a curved arm 90, whose free end terminates in an engaging pin 91, Fig. 14. The free end of this curved arm 90 is suitably guided by one end of the bar 88, such curved arm, in the present instance, being provided with a slot 92 receiving a pin 93, in such bar 88. The function of this arm 90 is to form a connection between the bar 88 and consequently the shaft 45, and the outermost adding wheel on the right, and to this end such wheel is provided on its outer face with a disk or ring 94, having ratchet teeth on its periphery corresponding in number to the number of indications on its wheel and also provided with a corresponding number of holes 95 extending transversely of such ring as clearly illustrated in Fig. 7. The location of these holes 95 is such that the pin 91 when moved to the left (Fig. 3) will enter the particular hole presented to it and thereby form an operating connection between the shaft 45 and the adding wheel of the lowest denomination. For the purpose of automatically making and breaking this connection, I provide suitable mechanism which, in the present instance and as shown in Figs. 3 and 7, consists of a shifter sleeve, 96, strung on and movable longitudinally of the shaft 45 and provided with two end flanges and one central flange 97. The curved arm 90 lies between the middle flange and the end flange on the left (Fig. 3) and therefore all movements of such shifter sleeve are communicated to the arm 90. The shifter sleeve is operated by means of an L-shaped shifter arm 98, as seen in Fig. 7, the upper or free end of which arm is laterally curved so that when elevated in the manner hereinafter described, it will coöperate with such shifter sleeve contacting the middle flange thereof and moving such flange to the left (Fig. 3). The other end of the shifter arm is secured to a sleeve 99, which is loosely mounted on the main rod 15, as clearly indicated in Figs. 3 and 7. This sleeve is provided with a rearwardly and downwardly extending contact plate 100, which is arranged to be actuated by the upper end of the rocking arm 24 in its forward movement whenever any one of the price keys is depressed. It will thus be seen that when a price key is operated as hereinbefore described the same movement of the rocking arm 23 which serves to operate the clamping mechanism 29 operates the shifter arm 98 by elevating the latter and thereby shifts the sleeve 96 to the left (Fig. 3), with the result that connection is made through the arm 90 and bar 88 between the shaft 45 and the end dial of the lowest denomination. It results from the operation of this connection that the same amount or value which is transferred from the gear segments 48 to the indicator wheels 43, 44, is likewise communicated to the adding wheels 46. In order to lock the adding wheel of the lowest denomination and consequently all of the adding wheels, I provide a locking pawl 101 pivoted at its lower end to the rod 79, which pawl is spring pressed inwardly so that its upper or free end will engage the teeth on the ring or disk 94, all as clearly indicated in Fig. 7. As indicated in Figs. 3 and 7, this locking pawl is operatively connected with an operating arm 102, which projects inwardly or forwardly of the machine between the two sets of wheels. This operating arm 102 is arranged in the path of movement of the shifter arm 98, with the result that when such shifter arm is elevated in the manner hereinbefore referred to, its upper end will contact the operating arm 102 and rock it rearwardly and thereby rock the locking pawl 101 out of engagement with its adding wheel and thereby permit such adding wheel to be rotated or partially rotated by the connector arm 90, as already described. When such connector arm becomes disengaged upon the dropping of the shifter arm 98, the locking pawl 101 will be restored to its locking engagement by means of the spring tension exerted thereon.

It will be understood from the foregoing description that the actuation of the gear segment 48 to the amount or degree permitted by the particular position represented by the main lever 7 of the scale, is transmitted directly to the indicator wheels 43, 44, or to the wheel 43 alone in case the amount is less than the capacity of such latter wheel. This results from the fact that the wheel 43 is secured to the shaft 45 and therefore actuated thereby. When the segment 48 is returned to normal position upon the operation of the handle 51, the indicator wheels 43, 44, are re-set, the wheel 43 being returned with the shaft 45 to zero position and the other wheel 44, if any amount has been transferred to it, being released by the connection 86 to permit its return to zero position. The adding wheels on the other hand are all loosely mounted on the shaft 45, but are operatively connected therewith through the medium of the make and break connection comprising, in the present instance, the bar or arms 88 and curved arm 90. In the operation of the machine the connector arm 90 is disconnected, but the gear segment 48 and the shaft 45 are returned to zero position, with the result that the amounts of the individual transactions are added or accumulated on the adding wheels. It will be understood that any ordinary and well known means for re-setting these adding wheels to zero position may be employed, but as is obvious, they may be re-set by hand by disengaging the carrying mechanism in the same manner that the arm 86 disengages the carrying mechanism of the wheel 44 and the adding wheel of the lowest denomination may be returned after simply releasing the locking pawl 101. In order to expose or exhibit the amounts indicated by the adding wheels, the casing 14 may be provided with a suitable side opening, such as the opening 14ª, as indicated in Fig. 7.

Figure 16:
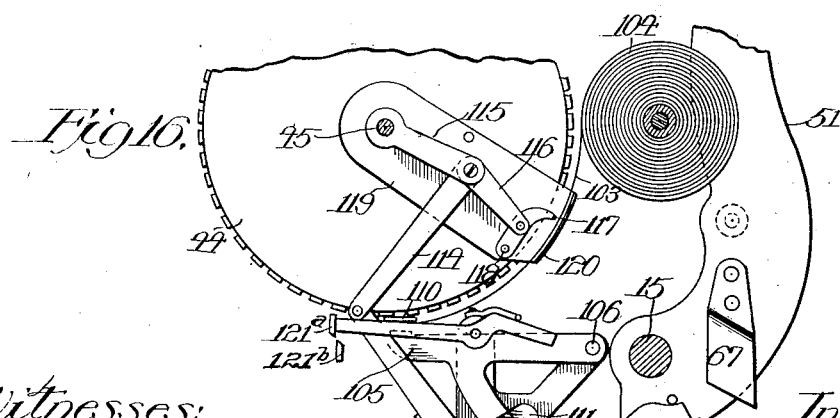

The mechanism for printing the amount of the individual transactions coöperates with the wheels 43, 44, additional mechanism being provided for cutting off the check from a roll or web of paper and ejecting it. As indicated in Figs. 6, 8 and 16, the strip of paper 103 is taken from a roll or web 104 suitably mounted on the machine, as indicated in the drawings, and carried to a point adjacent the under side of the wheels 43, 44 and in proximity to the printing mechanism now about to be described. As more clearly indicated in Fig. 16, a hammer 105 is pivoted at its forward end at 106 on an arm of a standard 113 and provided with a depending and curved contact arm 107, whose lower end is arranged in the path of movement of an anti-friction-roller 108. This roller is carried at the lower end of a spring-pressed pawl 109, pivoted at the lower end of the operating handle 51. The forward movement of such handle compels a rearward movement of the depending arm 107 and thereby forces the rearward end or hammer face of the hammer 105 upwardly and thereby forces a strip of paper against a ribbon 110 and the periphery of the wheels 43, 44 to thereby receive an imprint from the particular type presented by those wheels at that time. In the further movement of the operating handle 51 the roller 108 next contacts the arm 111 of a bell-crank 112 pivoted at its lower end to the post or supporting plate 113 arranged on the base of the machine. This bell-crank is connected by means of the link 114 with a pair of toggle levers 115 and 116, the former of which is loosely mounted upon the shaft 45 and the latter of which is pivotally connected to a paper feed pawl 117 pivoted at its lower end at 118 to a plate 119. This plate 119 is likewise pivoted on the shaft 45, so as to rock thereon and the same is provided at its forward edge with a flange 120, over whose inner face the strip of paper passes in its course through the machine and against which the pawl 117 grips the strip of paper and thereby unrolls or feeds the strip of paper the desired distance whenever the roller 108 contacts the arm 111, as described and thereby rocks the plate 119 in a clockwise direction, Fig. 16. These operating parts are held to the normal position indicated in Fig. 16 in any suitable manner by spring tension so that when the influence of the roller 108 has passed, the parts will be restored to their normal position shown; thus a spring 119ᵃ normally upholds the plate 119 and an inferior spring 112ᵃ normally upholds the bell crank 112. In the further continued movement of the operating handle, its roller 108 will contact the forward end of the knife 121 pivoted intermediate its length at the upper end of the plate 113 and having a suitable knife 121ᵃ at its rearward end coöperating with a fixed knife 121ᵇ for cutting the roll of paper in the proper lengths as checks, the rear arm of the lever 121 being normally upheld as by a spring 121ᶜ. Upon the return of the operating handle, the roller 108 will flip by the arms 107 and 111 without affecting them. According to this construction, the check is thus printed, cut off and ejected from the machine, such check indicating the amount or value of the article sold, just as it would be indicated on the chart of a computing scale, if such a chart is employed, as in the present instance for the purposes of illustration.

The mode of operation of the machine has already been described while explaining the construction, but the operation will now be described so that a clear understanding may be had of the sequence of the different movements. The article to be sold is placed upon the platform of the scale and the main lever 7 thereof will move to a position dependent upon the weight of such article. Assuming that in the present instance the article weighs five pounds and its price is 30¢ per pound, the salesman next operates or depresses the price key bearing the price "30", as indicated in Fig. 3. The first movement of this key operates the clamping jaws 29 and also the shifter sleeve 96, so as to put the adding dials in operative relation with the shaft 45, and thus be ready to receive the amount of the transaction. The inner or rearward end of the key which is of course being elevated strikes against the contact bar 34 and raises the latter until its movement is arrested by the stop 37 in the manner indicated in Fig. 5. The forward portion of the key, however, continues to be depressed until it is engaged by the locking bar or plate 39. This upward movement of the inner section of the price key also rocks the operating bail 49, with the result that the gear segment 48 is rotated in a clockwise direction, when viewed as in Fig. 6. The amount of rocking of this bail 49 and its gear segment is, of course, determined by the extent of upward movement of the inner end of the price key, whose movement is in turn limited or controlled by the particular position or height of the main scale beam 7. The movement of the gear segment 48 is thus transmitted through the pinion 47 and shaft 45 to the dial 43 which, under the example being referred to where the value of the article at 30¢ per pound would be $1.50, will be given one complete rotation and a partial rotation until the indication "50" will be presented to the printing mechanism. This dial 43, during its rotation has transferred "1" to its companion dial 44, so that the figures presented to the printing mechanism by the two dials 43, 44, will be $1.50. At the same time, the amount has been transferred to the adding dials. The next operation consists in drawing the operating handle 51 forwardly, with the result that the 30¢ price key will be unlocked, the clamping jaws opened, and the shifter sleeve 96 will be returned to normal position to thereby disengage the connector arm 90 from its adding dial. Just as soon as this disconnection takes place, the arm 67 will engage the contact arm 66, which is connected with the spring arm 65 and thereby restore the gear segment 48 to normal position. As a result of the return of the gear segment, the wheel 43, will be re-set to zero position, because of its direct connection with the shaft 45. The wheel 44 will be re-set by reason of the disengagement of its locking pawl through the medium of the link 86, which is connected with the operating handle 51 as hereinbefore explained. During this restoring movement the adding dials will not of course be re-set, because the connection between the shaft 45 and such adding dials has been broken, with the result that the dials will accumulate all the individual transactions. However, before the dials 43, 44 are re-set, and upon the initial movement of the operating handle 51, the printing mechanism is operated, thereby printing the check showing the individual transaction—in the present instance $1.50—and immediately thereafter the check is ejected after being cut off in the manner hereinbefore explained. When the operator's hand is released from the handle 51, the latter is returned by its spring pressure to normal position and the machine is now ready for the next transaction. As hereinbefore stated, it is not necessary to employ in connection with the scale proper, any chart for indicating either the weight or value—that is the usual computing scale chart or drum—but it is preferred to employ a chart or drum indicating the weight at least. However, for purposes of illustration, I have shown a computing scale chart substantially as shown in my patent aforesaid, for indicating both the weight and the value of the article. In case the computing scale chart is employed as herein illustrated, the price as indicated on the chart will, of course, be precisely the same as that printed upon the check which is generally given to the customer for payment at a cashier's desk.

In order to regulate the vibrations of the scale beam, pendulum and index arm a dash pot is preferably employed, the numeral 7$^c$ designating the cylinder thereof suitably supported in the base 2 and 7$^d$ the piston rod which is pivotally connected to a clevis 7$^e$ hung on the scale beam 7, all as shown in Figs. 1 and 3.

It is to be understood that the invention is not limited to the particular form of embodiment here shown, nor necessarily to the employment of all of the various elements in combination, but that various modifications may be made, both in the form and construction of parts and their mode of assemblage, without departing from the scope of the invention.

I claim:

1. The combination, with a weighing scale including a member whose position is determined by the weight of goods placed on the scale; of adding mechanism for accumulating values of goods at different prices per unit of weight, and key-operated mechanism differentially actuating said adding mechanism and differentially controlled by said scale member according to the position assumed by the latter under the influence of the applied load.

2. The combination, with a scale including a member whose position is determined by the weight of goods placed on the scale; of adding mechanism for accumulating the amounts of articles at different prices per unit of weight, and a series of keys representing different prices per unit of weight, said keys being operatively connected with the adding mechanism and controlled in their degree of effective movement by the position of said scale member.

3. The combination, with the movable weighing parts of a scale; of means for indicating the value of an article on the scale at different prices per unit of weight, key mechanism connected to the value indicating means and operating the same to give an indication upon the actuation of a key, the extent of movement of the indicating means being differentially controlled by the position of a movable part of the scale.

4. The combination with the movable weighing parts of a scale; of means for indicating the value of an article on the scale at different prices per unit of weight, key mechanism connected to the value indicating means and operating the same to give an indication upon the actuation of a key, the extent of movement of the indicating means being differentially controlled by the position of a movable part of the scale,—and printing mechanism coöperating with said indicating means.

5. The combination, with the movable weighing parts of a scale; of means for indicating the value of an article on the scale at different prices per unit of weight, key mechanism connected to the value indicating means and operating the same to give an indication upon the actuation of a key, the extent of movement of the indicating means being differentially controlled by the position of a movable part of the scale, mechanism coöperating with said indicating means for printing checks of the amounts of the individual transactions, and means for severing the checks.

6. The combination, with a scale including a member whose position is determined by the weight of the goods placed on the scale; of means for indicating the value of an article on the scale at different prices per unit of weight, and price-key-propelled mechanism controlling said indicating means and itself controlled by the position of said scale member.

7. The combination, with a scale including a member whose position is determined by the weight of the goods placed on the scale; of means for indicating the value of an article on the scale at different prices per unit of weight, and a series of keys representing different prices per unit of weight, said keys being operatively connected with the indicating means and controlled in their degree of effective movement by the position of said scale member.

8. The combination, with a scale including a member whose position is determined by the weight of goods placed on the scale, of wheels for indicating the amount of individual items at different prices per unit of weight, adding wheels for accumulating the amounts of different transactions, and price-key-propelled mechanism for operating the two sets of wheels and itself controlled by the position of said scale member.

9. The combination, with a scale including a member whose position is determined by the weight of goods placed on the scale; of wheels for indicating the amount of individual items at different prices per unit of weight, adding wheels for accumulating the amount of different transactions, operating mechanism coöperating with the two sets of wheels, and a series of keys representing different prices per unit of weight, said keys controlling the operating mechanism and themselves controlled in the extent of their effective movement by the position of said scale member.

10. The combination, with a scale including a member whose position is determined by the weight of goods placed on the scale; of wheels for indicating the amount of individual items at different prices per unit of weight, adding wheels for accumulating the amount of different transactions, and operating mechanism controlled by the position of said scale member and coöperating with the two sets of wheels and being directly connected to the individual item wheels and having a clutch connection with the adding wheels, said operating mechanism being variously movable according to price per unit of weight.

11. The combination, with a scale, of wheels for indicating the amount of individual items at different prices per unit of weight, adding wheels for accumulating the amount of different transactions, and key-actuated operating mechanism coöperating with the scale and with the two sets of wheels and being directly connected to the individual item wheels and indirectly with the adding wheels through a make and break connection.

12. The combination, with the scale beam or main lever of an automatic scale, of adding mechanism, and key-actuated mechanism controlled by the position of the scale beam for transferring to the adding mechanism the values of articles at different prices per unit of weight.

13. The combination, with the scale beam or main lever of an automatic scale, of adding mechanism, a series of keys representing different prices per unit of weight and controlled by the main lever of the scale, and operating mechanism controlled by said keys and coöperating with the adding mechanism.

14. The combination, with the scale beam or main lever of an automatic scale, of adding mechanism, a series of keys representing different prices per unit of weight and movable a distance determined by the particular position of the main lever according to the load or weight of the article on the scale, and operating mechanism controlled by said keys and coöperating with the adding mechanism.

15. The combination, with the scale beam or main lever of an automatic scale, of adding mechanism, a series of keys representing different prices per unit of weight and movable a distance determined by the particular position of the main lever, and operating connections with the adding mechanism movable different distances by the keys according to the value of the key operated and according to the position of the main lever.

16. The combination, with the scale beam or main lever of an automatic scale, of indicating wheels for representing the amount of individual transactions, differentially operable means controlled by the position of the scale beam for transferring to said wheels the values of articles at different prices per unit of weight without requiring previous price adjustment, and means for resetting said wheels to zero position upon the restoration of said mechanism.

17. The combination, with the scale beam or main lever of an automatic scale, of indicating wheels for representing the amount of individual transactions, key actuated mechanism controlled by the position of the scale beam for transferring to said dials the values of articles at different prices per unit of weight, and means for resetting said wheels to zero position upon the restoration of said mechanism to normal; substantially as described.

18. The combination, with the scale beam or main lever of an automatic scale, of indicating wheels for representing the amount of individual transactions, mechanism controlled by the position of the scale beam for transferring to said dials the values of articles at different prices per unit of weight, and a series of keys representing such different prices per unit of weight and controlled as to distance of effective movement, by the position of the main lever of the scale, any one of said keys being arranged to actuate said mechanism to an extent corresponding to its permitted movement, whereby the value of the article on the scale is indicated on said wheels; substantially as described.

19. The combination, with the scale beam or main lever of an automatic scale, of indicating wheels for representing the individual transactions, mechanism controlled by the position of the scale beam for transferring to said dials the values of articles at different prices per unit of weight, and a series of keys representing such different prices per unit of weight, and controlled as to distance of effective movement by the position of the main lever of the scale, any one of said keys being arranged to actuate said mechanism to an extent corresponding to its permitted movement whereby the value of the article on the scale is indicated on said wheels, said wheels being reset to zero position in the restoration of the said mechanism; substantially as described.

20. The combination with an automatic scale having a part movable to a position dependent upon the weight of the commodity being weighed, adding mechanism for accumulating the amounts of the transactions at different prices per unit of weight, means for operating the adding mechanism limited in the extent of its movement by the position of the scale beam and differentially operable according to prices per unit of weight, and means for holding the said movable part in counterbalanced position during the operation of the adding mechanism.

21. The combination, with the scale beam or main lever of an automatic scale, of means for holding said lever to the position to which it has been moved by the load, indicating mechanism for indicating the values of articles at different prices per unit of weight, and means for operating the indicating mechanism proportionately to the price per unit of weight and itself controlled by the particular position of the main lever of the scale; substantially as described.

22. The combination, with the scale beam or main lever of an automatic scale, of means for holding said lever to the position to which it has been moved by the load, indicating mechanism for indicating the values of articles at different prices per unit of weight, and key-actuated mechanism controlling the indicating mechanism and itself controlled by the particular position of the scale beam; substantially as described.

23. The combination, with the scale beam or main lever of an automatic scale, of means for holding said lever to the position to which it has been moved by the load, indicating mechanism for indicating the values of articles at different prices per unit of weight, a series of price keys representing different prices per unit of weight and controlled as to their extent of effective movement by the particular position of the main lever of the scale, and operating connections between said keys and the indicating mechanism; substantially as described.

24. The combination, with the scale beam or main lever of an automatic scale, of means for holding said lever to the position to which it has been moved by the load, indicating mechanism for indicating the values of articles at different prices per unit of weight, a series of price keys representing different prices per unit of weight and controlled as to their extent of effective movement by the particular position of the main lever of the scale, means for locking or detaining any one of the keys in operated or depressed position, and operating connections between said keys and the indicating mechanism; substantially as described.

25. The combination, with the main lever of an automatic scale, of means for holding the lever to the counterbalanced position to which it has been moved by the load, means for indicating the amounts of the individual transactions and for accumulating them, and means controlling said indicating means and itself controlled by the particular position of the main lever of the scale; substantially as described.

26. The combination, with the main lever of an automatic scale, of means for indicating the amount of the individual transactions at different prices per unit of weight, operating means controlling said indicating means and itself controlled as to degree of movement by the particular position of the main lever to which it has been moved by the load, and a clamp actuated, at the initial movement of the operating means, for holding the main lever in its said position; substantially as described.

27. The combination, with the main lever of an automatic scale, of means for indicating the amount of the individual transactions at different prices per unit of weight, operating means controlling said indicating means and itself controlled as to degree of effective movement by the particular position of the main lever to which it has been moved by the load, and clamping jaws adapted, when actuated, to grip the main lever and hold it in its counterbalanced position, said clamping jaws being actuated by said operating means; substantially as described.

28. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, said main lever having an extension, and clamping jaws adapted, when actuated, to grip said extension and thereby hold the main lever in its counterbalanced position, the clamping jaws being actuated by said operating means; substantially as described.

29. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, and clamping jaws normally held open with a yielding pressure, but adapted, when actuated, to grip the main lever of the scale and thereby hold it in its counterbalanced position, the clamping jaws being actuated by said operating means; substantially as described.

30. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, clamping mechanism comprising a pair of levers terminating at one end in jaws adapted to clamp and hold the main lever and at the other end in lever arms arranged in proximity, and a rocking arm adapted to enter between said arms and spread them apart to operate the jaws to clamp the main lever, said rocking arm being actuated by said operating mechanism; substantially as described.

31. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, clamping mechanism comprising a pair of levers terminating at one end in jaws adapted to clamp and hold the main lever and at the other end in lever arms arranged in proximity, anti-friction rollers on said lever arms, and a rocking arm adapted to enter between said rollers and thereby operate the jaws to clamp the main lever, said rocking arm being actuated by said operating mechanism; substantially as described.

32. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, and clamping jaws having adjustable clamping surfaces adapted, when actuated, to grip the main lever of the scale and thereby hold it in its counterbalanced position, the clamping jaws being actuated by said operating means; substantially as described.

33. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, and clamping jaws adapted, when actuated, to grip the main lever of the scale and thereby hold it in its counterbalanced position, the clamping jaws being actuated by said operating means and provided with adjustable screws constituting adjustable clamping surfaces; substantially as described.

34. The combination, with the main lever of an automatic scale, of means for indicating the amounts of the individual transactions at different prices per unit of weight, operating means controlling said indicating means and itself controlled as to degree of movement by the particular position of the main lever to which it has been moved by the load, said main lever having a depending sector, clamping jaws arranged on either side of the sector and adapted, when actuated, to grip the same and thereby hold the main lever in its counterbalanced position, and means for actuating the clamping jaws; substantially as described.

35. The combination, with the main lever of an automatic scale, of wheels on which the price or value of an article at a certain price per unit of weight is recorded, a stop bar movable in degree according to the particular position at which the main lever is brought by the article on the scale, a series of keys representing different prices per unit of weight and limited as to their movement by the stop bar, and mechanism actuated by any one of the keys and operatively connected with the wheels; substantially as described.

36. The combination, with the main lever of an automatic scale, of wheels on which the price or value of an article at a certain price per unit of weight is recorded, a stop bar movable in degree according to the particular position at which the main lever is brought by the article on the scale, a series of keys representing different prices per unit of weight and in whose path of movement the stop bar is interposed to govern their degree of movement, and operating connections between the keys and the wheels to transfer to the latter the value of the article as determined by the particular position of the main lever of the scale and the particular key operated; substantially as described.

37. The combination, with the main lever of an automatic scale, of wheels on which the price or value of an article at a certain price per unit of weight is recorded, a stop bar movable in degree according to the particular position at which the main lever is brought by the article on the scale, a series of keys representing different prices per unit of weight and in whose path of movement the stop bar is interposed to govern their degree of movement, means for locking any one of the keys in operated position, and operating connections between the keys and the wheels to transfer to the latter the value of the article as determined by the particular position of the main lever of the scale and the particular key operated; substantially as described.

38. The combination, with the main lever of an automatic scale, of wheels on which the price or value of an article at a certain price per unit of weight is recorded, a stop bar movable in degree according to the particular position at which the main lever is brought by the article on the scale, said bar being supported at its ends in ball and socket bearings, a series of keys representing different prices per unit of weight and limited as to their movement by the stop bar, and operating connections between the keys and the wheels; substantially as described.

39. The combination, with the main lever of an automatic scale, of wheels on which the price or value of an article at a certain price per unit of weight is recorded, a stop bar movable in degree according to the particular position at which the main lever is brought by the article on the scale, said bar being supported at its ends and adjustable in height as to one end, a series of keys representing different prices per unit of weight and limited as to the movement by the stop bar, and operating connections between the keys and the wheels; substantially as described.

40. The combination, with the main lever of an automatic scale, of wheels on which the price or value of an article at a certain price per unit of weight is recorded, a stop bar movable in degree according to the particular position at which the main lever is brought by the article on the scale, said bar being supported at its ends in ball and socket bearings, one of which is adjustable in height, a series of keys representing different prices per unit of weight and limited as to their movement by the stop bar and operating connections between the keys and the wheels; substantially as described.

41. The combination, with the main lever of an automatic scale, of wheels on which the price or value of an article at a certain price per unit of weight is recorded, a stop bar movable in degree according to the particular position at which the main lever is brought by the article on the scale, said bar being L-shaped and supported at its ends in ball and socket bearings, one of which is adjustable in height, a series of keys representing different prices per unit of weight and limited as to their movement by the stop bar, and operating connections between the keys and wheels; substantially as described.

42. The combination, with the main lever of an automatic scale, of wheels on which the price or value of an article at a certain price per unit of weight is recorded, a stop bar movable in degree according to the particular position at which the main lever is brought by the article on the scale, said bar being L-shaped and supported at its ends in ball and socket bearings, one of which is adjustable in height, a series of keys representing different prices per unit of weight, and movable in a plane substantially at right angles to the bar and adapted to be limited thereby as to degree of movement, and operating connections between the keys and wheels; substantially as described.

43. The combination, with the main lever of an automatic scale, of wheels on which the price or value of an article at a certain price per unit of weight is recorded, a stop bar movable in degree according to the particular position at which the main lever is brought by the article on the scale, a series of keys representing different prices per unit of weight and comprising levers pivoted intermediate their length with their inner ends movable in the range of the stop bar and adapted to be limited thereby as to degree of movement, and operating connections between the keys and the wheels; substantially as described.

44. The combination, with the main lever of an automatic scale, of wheels on which the price or value of an article at a certain price per unit of weight is recorded, a stop bar movable in degree according to the particular position at which the main lever is brought by the article on the scale, a series of keys representing different prices per unit of weight, each key comprising two parts or levers pivoted on a common axis and held together in normal relation with a yielding pressure, one arm being arranged to be limited as to its degree of movement by the stop bar and the other arm or member actuated by the operator being adapted to be moved to its limit of movement after the first arm is arrested by the stop bar, means for locking the said arm to its limit of movement, and operating connections between the keys and the wheels; substantially as described.

45. The combination, with the main lever of an automatic scale, of a projection or stop on the lever, a movable stop bar adapted to be stopped by said projection, a series of price keys representing different prices per unit of weight and limited as to degree of effecting movement by the stop bar, wheels for recording or indicating the amount or value of the article, and operating connections between said wheels and the keys; substantially as described.

46. The combination, with the main lever of an automatic scale, of a series of price keys representing different prices, per unit of weight, wheels for recording or indicating the value of the article, operating connections between said wheels and keys, and means for controlling or determining the degree of effective movement of any one of the keys according to the weight of the article on the scale and the consequent position of the main lever thereof comprising a stop on the main lever, and a stop bar for limiting the movement of the price keys and itself limited by the stop on the lever; substantially as described.

47. The combination with the main lever of an automatic scale, of a series of price keys representing different prices per unit of weight, wheels for recording or indicating the value of the article, operating connections between said wheels and keys, means for clamping or holding the main lever to the particular position to which it has been moved by the article on the scale; substantially as described.

48. The combination, with the main lever of an automatic scale, of a series of price keys representing different prices per unit of weight, wheels for recording or indicating the value of the article, operating connections between said wheels and keys, and means for controlling or determining the degree of movement of any one of the keys according to the weight of the article on the scale and the consequent position of the main lever thereof, comprising a stop arranged near the outer or free end of the main lever, and a stop bar arranged to be limited as to the degree of its movement by the stop and itself arranged in the path of movement of the keys, whereby the degree of effective movement of the latter is limited according to the stop bar and consequently according to the particular position of the main lever; substantially as described.

49. The combination, with the main lever of an automatic scale, of a series of price keys representing different prices per unit of weight, wheels for recording or indicating the value of the article, operating connections between said wheels and keys, and means for controlling or determining the degree of effective movement of any one of the keys according to the weight of the article on the scale and the consequent position of the main lever thereof, comprising a stop arranged near the outer or free end of the main lever, and a stop bar arranged to be limited as to the degree of its movement by the stop and itself arranged in the path of movement of the keys, whereby the degree of effective movement of the latter is limited according to the stop bar and consequently according to the particular position of the main lever, and a sector depending from such outer end of the lever, and mechanism for clamping such sector and consequently the main lever; substantially as described.

50. The combination, with the main lever of an automatic scale, of a series of price keys representing different prices per unit of weight, wheels for recording or indicating the value of the article, operating connections between said wheels and keys, and means for controlling or determining the degree of movement of any one of the keys according to the weight of the article on the scale and the consequent position of the main lever thereof, comprising a stop arranged near the outer or free end of the main lever, and a stop bar arranged to be limited as to the degree of its movement by the stop and itself arranged in the path of movement of the keys, whereby the degree of effective movement of the latter is limited according to the stop bar and consequently according to the particular position of the main lever, a sector depending from such outer end of the lever, and mechanism controlled by the keys and actuated by any one of them at its initial movement to clamp such sector and hold the same in the position to which it has been moved by the article on the scale; substantially as described.

51. The combination, with the main lever of an automatic weighing scale and mechanism for indicating the weight of an article; of wheels for indicating the value of the article at different prices per unit of weight, means for operating said wheels and connections from said operating means under the control of the main lever of the scale for operating said wheels according to different prices per unit of weight without previous price adjustment.

52. The combination, with the main lever of an automatic weighing scale and mechanism for indicating the weight of an article; of wheels for indicating the value of the article at different prices per unit of weight, keys representing prices per unit of weight and controlled by the main lever as to degree of effective movement, and operating connections between the keys and the wheels.

53. The combination, with the main lever of an automatic weighing scale and its price computing and indicating means; of adding mechanism for accumulating the amounts of the different transactions, a source of movement and connections from said source of movement controlled in extent of movement by the position of the main lever for actuating the adding mechanism differentially according to price per unit of weight but without previous price adjustment.

54. The combination, with the main lever of an automatic weighing scale, and its price computing and indicating mechanism; of adding mechanism for accumulating the amounts of the different transactions, and key-actuated mechanism controlled in extent of movement by the position of said main lever for actuating the adding mechanism differentially according to price per unit of weight but without previous price adjustment.

55. The combination, with the main lever of an automatic weighing scale and its mechanism for indicating weight and computing the price of the article; of adding mechanism for accumulating the amounts of the different transactions, a manually movable part and actuating connections from the movable part controlled in extent of movement by the position of the main lever effecting differential actuation of the adding mechanism according to varying prices per unit of weight without previous price adjustment.

56. The combination, with the main lever of an automatic weighing scale, and its mechanism for indicating weight and computing the price of the article; of adding mechanism for accumulating the amounts of the different transactions, wheels for indicating the value of the article, impulse receiving means and actuating connections for transmitting impulse to said adding mechanism and said indicating wheels controlled in extent of movement by the position of the main lever.

57. The combination, with the main lever of an automatic weighing scale, and its mechanism for indicating weight and computing the price of the article; of adding mechanism for accumulating the amounts of the different transactions, a series of keys representing different prices per unit of weight, and controlled as to degree of effective movement by the position of the main lever of the scale, and connections under the control of said keys for actuating the adding mechanism.

58. The combination, with the main lever of an automatic weighing scale, and its mechanism for indicating the weight and computing the price of the article; of adding mechanism for accumulating the amounts of the different transactions, wheels for indicating the value of the article, a series of keys representing different prices per unit of weight, and controlled as to degree of effective movement by the position of the main lever of the scale, and connections under the control of the keys for actuating the adding mechanism and the said wheels.

59. The combination, with the main lever of an automatic weighing scale, and its price computing and weighing mechanism; of wheels for indicating the value of the article at different prices per unit of weight, printing mechanism coöperating with said wheels, impulse receiving means, and actuating connections for transmitting impulse to said wheels controlled by the position of the main lever and effecting actuation of said wheels differentially according to different prices per unit of weight but without previous price adjustment.

60. The combination, with the main lever of an automatic scale and its price computing and weighing mechanism, of wheels for indicating the value of the article at different prices per unit of weight, printing mechanism coöperating with the wheels, keys representing different prices per unit of weight and controlled in their effective movement by the position of the main lever, and operating connections between the keys and the wheels; substantially as described.

61. The combination, with the main lever of an automatic scale, of wheels for indicating the value of the article, a series of keys representing different prices per unit of weight, and controlled by the position of the main lever as to degree of effective movement, a locking bail for detaining the keys in operated position, means for unlocking such bail in the restoration of the parts, and operating connections between said keys and wheels; substantially as described.

62. The combination, with the main lever of an automatic scale, of wheels for indicating the value of the article, a series of keys representing different prices per unit of weight, and controlled by the position of the main lever as to degree of effective movement, clamping mechanism for holding the main lever in the position to which it has been moved by the article on the scale, a bail operated by the keys for actuating the clamping mechanism, and operating connections between said keys and wheels; substantially as described.

63. The combination, with the main lever of an automatic scale, of wheels for indicating the value of the article, a series of keys representing prices per unit of weight, and controlled by the position of the main lever as to degree of effective movement, clamping jaws for engaging and holding the main lever in the position to which it has been moved by the article on the scale, a rocking arm for closing said jaws onto the lever to clamp it, a bail operated by the keys for actuating said rocking arm, and operating connections between said keys and wheels; substantially as described.

64. The combination, with the main lever of an automatic scale, of wheels for indicating the value of the article, a series of keys representing different prices per unit of weight, and controlled by the position of the main lever as to degree of effective movement, operating mechanism between said keys and wheels, adding mechanism arranged to be operatively connected with the operating mechanism, and means controlled by the keys for controlling said connection with the adding mechanism; substantially as described.

65. The combination, with the main lever of an automatic scale, of wheels for indicating the value of the article, a series of keys representing different prices per unit of weight, and controlled by the main lever as to degree of effective movement, operating mechanism between said keys and wheels, adding mechanism arranged to be operatively connected with the operating mechanism and a bail actuated by any one of the keys and controlling the connection between said operating mechanism and the adding mechanism; substantially as described.

66. The combination, with the main lever of an automatic scale, of wheels for indicating the value of the article, a series of keys representing different prices per unit of weight, and controlled by the main lever as to degree of effective movement, operating mechanism between said keys and wheels, adding mechanism arranged to be operatively connected with the operating mechanism, a make and break connection between the adding mechanism and operating mechanism, and a bail actuated by any one of the keys and operatively connected with said make and break connection for making the connection upon the operation of any one of the keys; substantially as described.

67. The combination, with the main lever of an automatic scale, of wheels for indicating the value of the article, a series of keys representing different prices per unit of weight, and controlled by the position of the main lever as to degree of effective movement, operating mechanism between said keys and wheels, adding mechanism arranged to be operatively connected with the operating mechanism, said adding mechanism consisting of a series of adding wheels or wheels, a shifting make and break connection between the adding mechanism and operating mechanism, a shifter therefor, and a bail actuated by any one of the keys and operatively connected with the shifter; substantially as described.

68. The combination, with the main lever of an automatic scale, of wheels for indicating the value of the article, a series of keys representing different prices per unit of weight and controlled by the position of the main lever as to degree of effective movement, operating mechanism between said keys and wheels, adding mechanism arranged to be operatively connected with the operating mechanism, a shifting make and break connection between the adding mechanism and operating mechanism, a shifter therefor, a bail actuated by any one of the keys, and a shifter arm connected with the bail and coöperating with the said shifter; substantially as described.

69. The combination, with the main lever of an automatic scale, of wheels for indicating the value of the article, a series of keys representing different prices per unit of weight, and controlled by the position of the main lever as to degree of effective movement, operating mechanism between said keys and wheels, adding mechanism arranged to be operatively connected with the operating mechanism, a bail actuated by any one of the keys and controlling the connection between said operating mechanism and the adding mechanism, and means actuated by said bail for clamping the main lever of the scale in the position to which it has been moved by the article on the scale; substantially as described.

70. The combination, with the main lever of an automatic scale, of wheels for indicating the value of the article, a series of keys representing different prices per unit of weight, and controlled by the main lever as to degree of effective movement, operating mechanism between said keys and wheels, adding mechanism arranged to be operatively connected with the operating mechanism, a bail actuated by any one of the keys and controlling the connection between said operating mechanism and the adding mechanism, means actuated by said bail for clamping the lever of the scale after the same becomes counterbalanced, and means for detaining or locking any one of the keys in operated position; substantially as described.

71. The combination, with the main lever of an automatic scale, of a series of keys representing different prices per unit of weight and controlled as to degree of effective movement by the position of the lever, a series of adding wheels having a make and break operating connection with the keys, means actuated by the keys for controlling the make and break, a locking pawl for the first adding wheel, and means for unlocking the pawl when the connection is made with the adding wheels; substantially as described.

72. The combination, with the main lever of an automatic scale, of a series of keys representing different prices per unit of weight and controlled as to degree of effective movement by the position of the lever, a series of adding wheels having a make and break operating connection with the keys, a bail actuated by the keys for controlling the make and break, a locking pawl for the first adding wheel, and means for unlocking the pawl when the connection is made with the adding wheels; substantially as described.

73. The combination, with the main lever of an automatic scale, of a series of keys representing different prices per unit of weight and controlled as to degree of effective movement by the position of the lever, a series of adding wheels having a make and break operating connection with the keys, a bail actuated by the keys for controlling the make and break, and a locking pawl for the first adding wheel and operated by the bail; substantially as described.

74. The combination, with the main lever of an automatic scale, of a series of keys representing different prices per unit of weight and controlled as to degree of effective movement by the position of the lever, a rotatable shaft operatively connected with the keys and rotated different distances according to the particular key operated and the particular position of the main lever, adding wheels mounted loosely on said shaft and a make and break connection arranged between said shaft and the adding wheels and controlled by the keys; substantially as described.

75. The combination, with the main lever of an automatic scale, of a series of keys representing different prices per unit of weight and controlled as to degree of effective movement by the position of the lever, a rotatable shaft operatively connected with the keys and rotated different distances according to the particular key operated and the particular position of the main lever, a wheel secured to the shaft for indicating the amount of the individual transactions, an adding wheel loosely mounted on the shaft, and a make and break connection arranged between said shaft and the adding wheel and controlled by the keys; substantially as described.

76. The combination, with the main lever of an automatic scale, of a series of keys representing different prices per unit of weight and controlled as to degree of effective movement by the position of the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft, a connector arm mounted on the bar and adapted to be shifted to engage the adding wheel of lowest denomination, and an operating connection between said arm and the keys; substantially as described.

77. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft diametrically thereof, a connector arm pivoted on one end of the bar and when shifted adapted to engage the adding wheel of lowest denomination, a shifter movable longitudinally of the shaft and connected with said arm, and an operating connection between the shifter and keys; substantially as described.

78. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft adjacent the first wheel or wheel of the lowest denomination, said first wheel having on one side or face a circular row of holes, a connector arm pivoted on the bar with its free end arranged to be shifted or inserted into any one of the holes presented to it, and means for shifting the arm; substantially as described.

79. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft adjacent the first wheel or wheel of the lowest denomination, said first wheel having on one side or face a circular row of holes, a connector arm pivoted on the bar with its free end arranged to be shifted or inserted into any one of the holes presented to it and an operating connection between the arm and the keys for shifting the former into engagement with the wheel at the initial movement of any one of the keys; substantially as described.

80. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft adjacent the first wheel or wheel of the lowest denomination, said first wheel having on one side or face a circular row of holes, a connector arm pivoted on the bar with its free end arranged to be shifted or inserted into any one of the holes presented to it, a shifter sleeve arranged upon the shaft in coöperative relationship with the arm, and a shifter arm actuated by the operation of any one of the keys for shifting said sleeve; substantially as described.

81. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and break connection between said shaft and the adding wheels comprising a bar secured to the shaft adjacent the first wheel or wheel of the lowest denomination, said first wheel having on its outer face a ring or disk provided on its edge with a series of teeth and on its side with a circular series of holes, a locking pawl normally engaging said teeth to lock its wheel, a connector arm pivoted on the bar with its free end adapted when shifted to enter any one of the holes presented to it, and means controlled by any one of the keys for unlocking the pawl and for shifting said arm into operative relation with the first wheel; substantially as described.

82. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, adding wheels mounted loosely on said shaft and a make and a break connection between said shaft and the adding wheels comprising a bar secured to the shaft adjacent the first wheel or wheel of the lowest denomination, said first wheel having on its outer face a ring or disk provided on its edge with a series of teeth and on its side with a circular series of holes, a locking pawl normally engaging said teeth to lock its wheel, a connector arm pivoted on the bar with its free end adapted when shifted to enter one of the holes presented to it, a flanged shifter sleeve mounted loosely on the shaft and coöperating with the arm to shift it, and a shifter arm actuated by any key operated and arranged to unlock the pawl and to shift said sleeve; substantially as described.

83. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, a plurality of dials for indicating the amount of the individual transactions, the first dial or dials of lowest denomination being secured to the shaft, transfer and locking mechanism for said dials, and an operating handle for restoring the parts to normal position and operatively connected with the transfer and locking mechanism for restoring the wheels with the exception of the first wheel which is restored by the restoration of the shaft; substantially as described.

84. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, a pinion on the shaft, a gear segment meshing with the pinion, and an operating connection between the segment and the keys; substantially as described.

85. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, a pinion on the shaft, a gear segment meshing with the pinion, a bail connected with the segment and rocked by any one of the keys operated; substantially as described.

86. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, a plurality of wheels for indicating the amount of the individual transactions, the first wheel being secured to the shaft, and the other wheel or wheels being loosely mounted thereon and normally held to zero position with a yielding pressure, transfer mechanism for transferring or carrying one from the first dial, locking mechanism for the wheel or wheels succeeding the first one, and means operated on the restoration of the machine for disengaging the locking mechanism to permit its wheel to return to zero position; substantially as described.

87. The combination, with the main lever of an automatic scale, of a series of keys representing different prices per unit of weight and controlled as to degree of effective movement by the lever, a rotatable shaft operatively connected with the keys and rotated different distances according to the particular key operated and the particular position of the main lever, a plurality of wheels for indicating the amount of the individual transactions, the first wheel being secured to the shaft, and the other wheel or wheels being loosely mounted thereon and normally held to zero position with a yielding pressure, transfer mechanism for transferring or carrying one from the first wheel, locking mechanism for the wheel or wheels succeeding the first one, and a swinging yoke operatively connected with the locking mechanism and actuated in the restoration of the machine to disengage the locking mechanism to permit its wheel to return to zero position; substantially as described.

88. The combination, with the main lever or scale beam of an automatic scale, of wheels for indicating the value of articles at different prices per unit of weight, operating mechanism controlled as to extent of movement by the particular position of the main lever and arranged to actuate the wheels accordingly, printing mechanism co-operating with the dials, and an operating handle for actuating the printing mechanism and restoring said operating mechanism to normal position; substantially as described.

89. The combination, with the main lever or scale beam of an automatic scale, of wheels for indicating the value of articles at different prices per unit of weight, operating mechanism controlled as to extent of movement by the particular position of the main lever and arranged to actuate the wheels accordingly, a series of price keys co-operating with the operating mechanism and representing different prices per unit of weight, means for locking or detaining any one of the keys in operated position, printing mechanism coöperating with the dials, and an operating handle for first actuating the printing mechanism and then restoring the operating mechanism and unlocking the operated key; substantially as described.

90. The combination, with the main lever or scale beam of an automatic scale, of wheels for indicating the value of articles at different prices per unit of weight, operating mechanism controlled as to extent of movement by the particular position of the main lever and arranged to actuate the wheels accordingly, mechanism coöperating with the wheels for printing a check from a strip or roll and for ejecting such check, and an operating handle for first actuating the last named mechanism and then restoring the operating mechanism to normal position; substantially as described.

91. The combination, with the main lever or scale beam of an automatic scale, of wheels for indicating the value of articles at different prices per unit of weight, operating mechanism controlled as to extent of movement by the particular position of the main lever and arranged to actuate the wheels accordingly, printing mechanism co-operating with the wheels, an operating handle for actuating the printing mechanism and restoring said operating mechanism to normal position, and a connection with the handle for resetting the dials to zero position; substantially as described.

92. The combination, with the main lever or scale beam of an automatic scale, of wheels for indicating the value of articles at different prices per unit of weight, a shaft on which such wheels are mounted, a gear segment for operating the shaft, operating connections for rocking the segment different distances according to the value of the article, and an operating handle adapted to restore said segment to normal position after an operation of the machine; substantially as described.

93. The combination, with the main lever or scale beam of an automatic scale, of wheels for indicating the value of articles at different prices per unit of weight, a shaft on which such wheels are mounted, a gear segment for operating the shaft, operating connections for rocking the segment different distances according to the value of the article, an operating handle and a flexible operating connection between the handle and segment; substantially as described.

94. The combination with the main lever or scale beam of an automatic scale, of wheels for indicating the value of articles at different prices per unit of weight, a shaft on which such wheels are mounted, a gear segment for operating the shaft, operating connections for rocking the segment different distances according to the value of the article, an operating handle having a contact arm 67, and a flexible connection 65 between the segment and the contact arm 67 and actuated by the latter in the restoration of the segment, shaft and wheels to normal or zero position; substantially as described.

95. The combination, with the main lever or scale beam of an automatic scale, of wheels for indicating the value of articles at different prices per unit of weight, a shaft on which such wheels are mounted, a gear segment for operating the shaft, operating connections for rocking the segment different distances according to the value of the article, an operating handle having a contact arm 67, a flexible connection 65 adapted to be rocked by the arm 67 against the segment to restore the latter and the wheels to normal position; substantially as described.

96. The combination, with the main lever or scale beam of an automatic scale, of wheels for indicating the value of articles at different prices per unit of weight, operating mechanism controlled in extent of movement by the position of the main lever for actuating the wheels, an operating handle for restoring such operating mechanism and wheels to normal position, and means for preventing another operation of the machine until the handle has completed its full stroke; substantially as described.

97. The combination, with the main lever or scale beam of an automatic scale, of wheels for indicating the value of articles at different prices per unit of weight, operating mechanism controlled in extent of movement by the position of the main lever for actuating the wheels, an operating handle for restoring such operating mechanism and wheels to normal position, and means controlled by the operating handle for preventing another operation of the machine until the handle has completed its full stroke; substantially as described.

98. The combination, with the main lever or scale beam of an automatic scale, of wheels for indicating the value of articles at different prices per unit of weight, operating mechanism controlled in extent of movement by the position of the main lever for actuating the wheels, an operating handle for restoring such operating mechanism and wheels to normal position, and means controlled by the operating handle for preventing another operation of the machine until the handle has completed its full stroke, comprising a locking plate carried by the operating mechanism, and a pivoted arm 58 controlled by the handle and having a pin 62 arranged to be moved into the path of movement of the locking plate and prevent movement of the latter after restoration of the parts; substantially as described.

99. The combination in a weighing scale having a movable member, of computing mechanism, and manually operable means adapted to operate the computing mechanism proportionally to the value per unit of weight of the commodity being weighed, and a connection between the manually operable means and the computing mechanism limited in its movement by the position of the movable member of the scale.

100. The combination in a weighing scale having a movable member, of computing mechanism, and manually operable means adapted to operate the computing mechanism proportionally to the value per unit of weight of the commodity being weighed, and a connection between the manually operable means and the computing mechanism, the extent of movement imparted to the computing mechanism from the manually operated element being limited by the position of the movable member of the scale.

101. The combination in a weighing scale having a movable member, of computing mechanism, price keys and connections between the latter and the computing mechanism limited in extent of their movement by the position of the movable member of the scale and operating upon the depression of a key to give an indication upon the computing mechanism.

102. The combination in a weighing scale having a movable member, of computing mechanism, and manually operated means adapted to operate the computing mechanism proportionally to the value per unit of weight of the commodity being weighed, a connection between the latter and the computing mechanism limited in its movement by the position of the movable member of the scale, and means for printing the individual computations.

103. The combination in a weighing scale having a movable member, of computing mechanism, and manually operated means adapted to operate the computing mechanism proportionally to the value per unit of weight of the commodity being weighed, a connection between the latter and the computing mechanism limited in its movement by the position of the movable member of the scale, means for feeding and printing a strip, and means for severing the strip to produce checks.

104. The combination in a weighing scale having a movable member, of computing mechanism, and manually operated means adapted to operate the computing mechanism proportionally to the value per unit of weight of the commodity being weighed, a connection between the latter and the computing mechanism limited in its movement by the position of the movable member of the scale, and means for accumulating a total of computations.

105. The combination in a weighing scale having a movable member, of computing mechanism, and manually operated means adapted to operate the computing mechanism proportionally to the value per unit of weight of the commodity being weighed, a connection between the latter and the computing mechanism limited in its movement by the position of the movable member of the scale, means for printing the individual computations, and means for accumulating a total of computations.

ALLEN DE VILBISS, Jr.

Witnesses:
S. E. HIBBEN,
LOUIS B. ERWIN.